No. 655,997. Patented Aug. 14, 1900.
J. W. SPURLOCK.
AUTOMATIC AIR PIPE COUPLING.
(Application filed Mar. 21, 1900.)
(No Model.) 2 Sheets—Sheet 1.

WITNESSES:

INVENTOR
John W. Spurlock
by Munn & Co.
ATTORNEYS

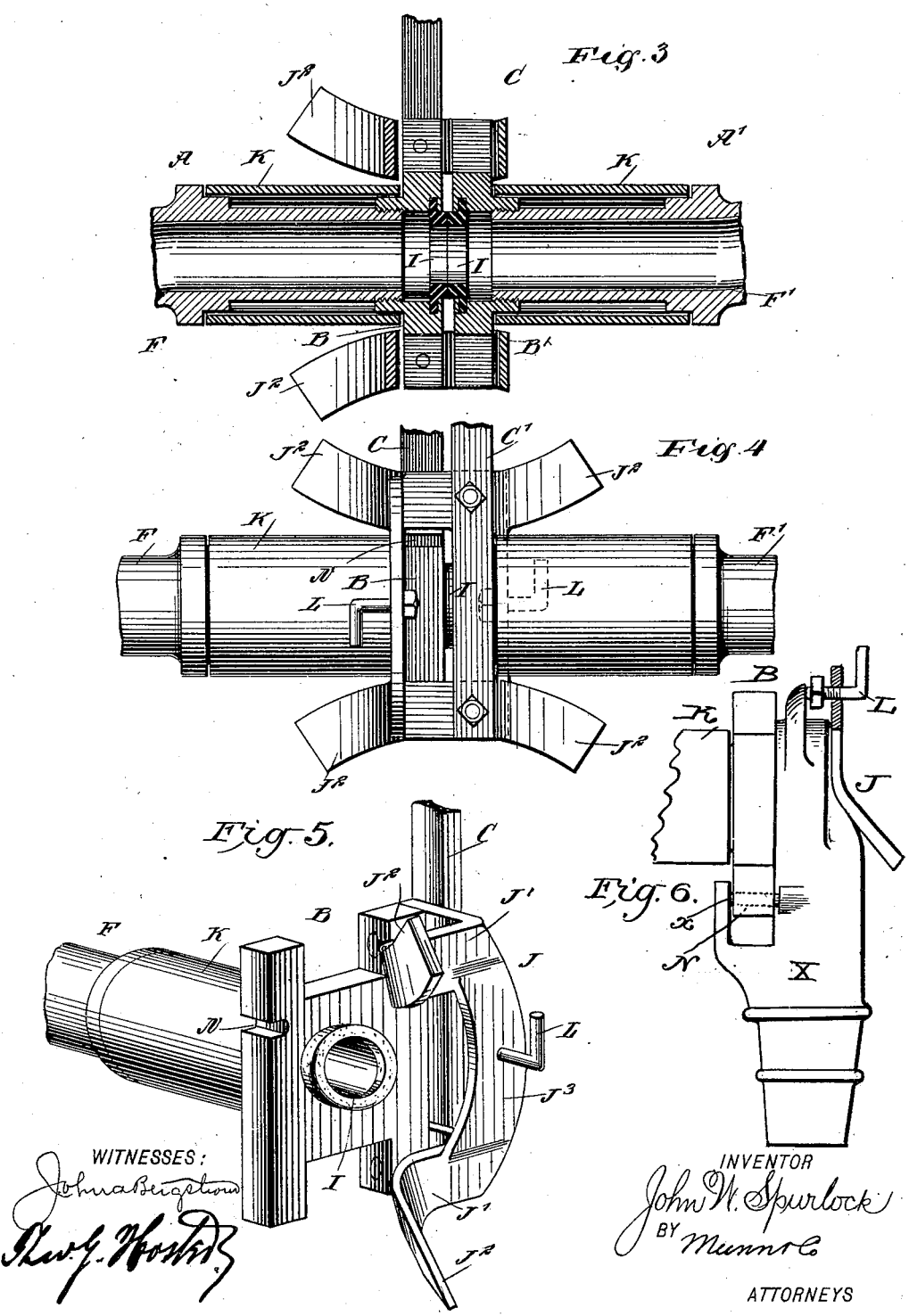

UNITED STATES PATENT OFFICE.

JOHN W. SPURLOCK, OF TY TY, GEORGIA, ASSIGNOR OF ONE-HALF TO ELIZA C. TIFT, OF TIFTON, GEORGIA.

AUTOMATIC AIR-PIPE COUPLING.

SPECIFICATION forming part of Letters Patent No. 655,997, dated August 14, 1900.

Application filed March 21, 1900. Serial No. 9,562. (No model.)

*To all whom it may concern:*

Be it known that I, JOHN W. SPURLOCK, a citizen of the United States, and a resident of Ty Ty, in the county of Worth and State of Georgia, have invented a new and Improved Automatic Air-Pipe Coupling, of which the following is a full, clear, and exact description.

The invention relates to fluid-pressure brakes; and its object is to provide a new and improved automatic air-pipe coupling arranged to insure a positive coupling of the hose between adjacent cars at the time the latter are coupled and to allow of coupling one member of the coupling with the member of an ordinary coupling in case the adjacent car is equipped with such ordinary coupling.

The invention consists of novel features and parts and combinations of the same, as will be fully described hereinafter, and then pointed out in the claims.

A practical embodiment of my invention is represented in the accompanying drawings, forming a part of this specification, in which similar characters of reference indicate corresponding parts in all of the views.

Figure 1:
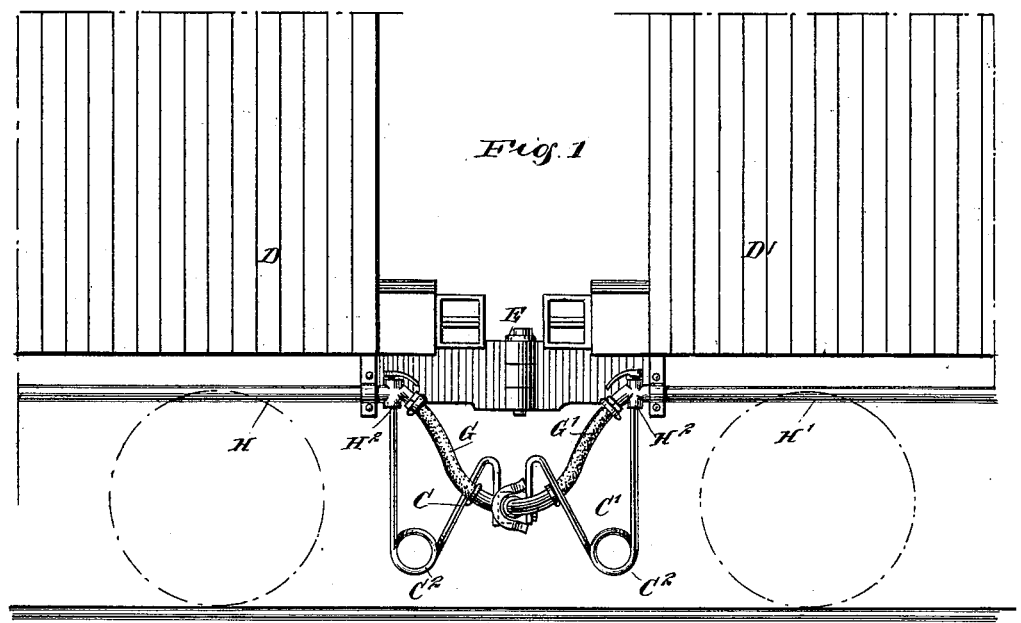
Figure 2:
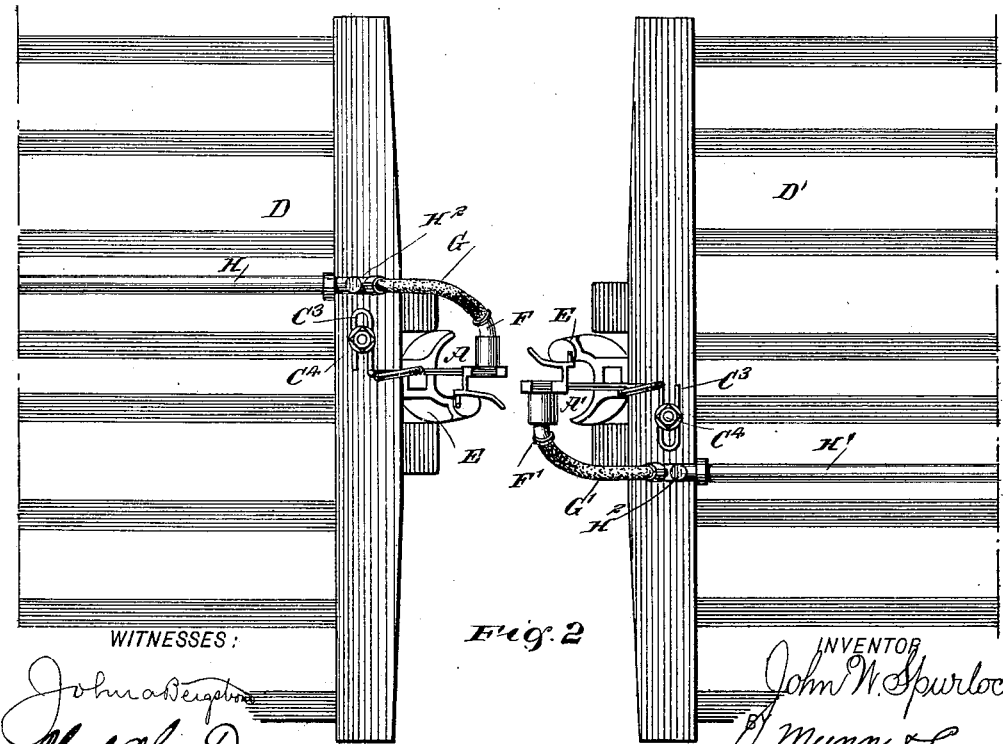

Figure 1 is a side elevation of the improvement as applied and with the members of the coupling in a coupled position. Fig. 2 is an inverted plan view of the same with the members uncoupled. Fig. 3 is an enlarged transverse section of the improvement. Fig. 4 is an end elevation of the same. Fig. 5 is a perspective view of one of the members of the coupling; and Fig. 6 is a plan view, partly in section, of one member of the coupling, having an ordinary coupling member secured thereto.

The improved coupling consists, essentially, of two members A and A', which are alike in construction and are provided with bodies B and B', secured to the free ends of spring-rods C and C', fastened to the under side of the end cross-beams of the cars D D', respectively, for being coupled in the usual manner by the usual car-coupling E, as indicated in Figs. 1 and 2.

The coupling-faces of the bodies B and B' extend longitudinally, and from the said bodies extend transversely in opposite directions the pipes F and F', screwed or otherwise secured to the said bodies and connected at their free ends with the hose G G', connected to the train-pipes H H', extending under the cars D D' in the usual manner and forming part of the fluid-pressure brakes with which the cars are equipped. Each pipe H or H' under a car is provided adjacent to its hose G or G' with the usual cut-off valve $H^2$, as indicated in Figs. 1 and 2.

On the adjacent or coupling faces of the bodies B and B' are arranged gaskets I, of rubber or other elastic material, to project somewhat beyond the faces of the bodies, so that when the two gaskets of the members come together a very tight joint is produced to prevent leakage of air. The two gaskets I of the members are forced in firm contact with each other when the cars are in the act of coupling, and for this purpose the bodies are provided with forks J, each having its prongs J' extending a distance from the face of the corresponding body to allow the other body to pass edgewise into the other member, and said prongs J' have their outer ends flaring in an outward direction, as at $J^2$, obliquely to the coupling-faces of the bodies to insure a proper guiding of one body in the other coupling member when the two cars are backed up for coupling.

In order to insure a proper coupling, the two spring-rods C and C' are so arranged that the coupling-faces of the two members come together immediately previous to the actual coupling of the cars taking place by means of the couplings E, so that when the final coupling of the two cars is accomplished the two spring-rods C and C' are under tension to such an extent that the faces of the bodies B B' are in proper coupling engagement, with the gaskets I in firm contact, to prevent leakage of air at the coupling.

The forked prongs J' of one coupling member are adapted to ride on a friction-roller K, held on suitable bearings on the pipe F or F' of the other coupling member, as will be readily understood by reference to Figs. 3 and 4, the said friction-roller K also serving as a stop for the fork to prevent the coupling members from moving too far when a coupling takes place, it being understood that the middle bars $J^3$ of the forks J abut against the said friction-rollers when a coupling is effected. On each middle bar J³ of a fork is arranged an L-shaped bolt L for securing the member of an ordinary coupling to one of the improved members of my coupling, as described, in case the adjacent car is equipped with such ordinary coupling. The body B or B' of each coupling member is also provided with a notch N for receiving a part of the ordinary hand-coupling, so that the body and the bolt L operate in conjunction to hold the ordinary coupling member in position.

To attach an ordinary coupling member X to my improved coupling member, the fulcrum-pin x of the ordinary coupling member is inserted in the slot N, and the bolt L is screwed down on the flange of the ordinary coupling member, as clearly shown in Fig. 6.

As shown, the spring-bars C and C' are each formed with goosenecks, to which the bodies are secured by bolts or other means, and each spring-bar is provided with a coil-spring C² at the lower end of the goosenecks and at the junction with the vertical member of the spring-bar, as is plainly indicated in Figs. 1 and 2. The upper ends of the spring-bars C and C' are doubled up or slotted, as at C³, to be engaged by a bolt C⁴ for attaching said end to the car, the slotted end permitting transverse adjustment of the bar to bring the coupling member in proper position relative to the coupling member on the opposite car.

From the foregoing it is evident that the two faces of the coupling members stand in a longitudinal direction—that is, in the direction of the length of the cars.

Having thus described my invention, I claim as new and desire to secure by Letters Patent—

1. An automatic air-pipe coupling, comprising two members, and spring-rods for supporting the same from the cars, the spring-rods being formed with coils between their ends and arranged for holding the members under the tension of the springs, when coupled, substantially as described.

2. An automatic air-pipe coupling, comprising two members having longitudinally-extending coupling-faces, guides for guiding one coupling-face upon the other and for limiting the movement of the members in one direction when coupling the members, and spring-rods for supporting the members and for holding the same under tension when in a coupled position, the spring-rods being formed with coils between their ends, substantially as described.

3. An automatic air-pipe coupling, having a member comprising a body with a longitudinally-extending coupling-face, a pipe extending transversely from the said member for connection with the coupling-hose, a gasket set in the said face and projecting therefrom, with the inner end of the gasket in communication with the pipe, and a forked guide carried by the said body, said guide projecting from one edge of the body and extending with its prongs in front of the coupling-face of the body, substantially as described.

4. An automatic air-pipe coupling, having a member comprising a body with a longitudinally-extending coupling-face, a pipe extending transversely from the said member for connection with the coupling-hose, a gasket set in the said face and projecting therefrom, with the inner end of the gasket in communication with the pipe, and a forked guide carried by the said body, said guide projecting from one edge of the body and extending with its prongs in front of the coupling-face, the outer ends of the prongs flaring outwardly from the said face and in an oblique direction thereto, substantially as described.

5. An automatic air-pipe coupling, having a member comprising a body with a longitudinally-extending coupling-face, a pipe leading from the said member for connection with the coupling-hose, a gasket set in the said face and projecting therefrom with the inner end of the gasket in communication with the pipe, a forked guide carried by the said body and extending with its prongs in front of the coupling-face, the outer ends of the prongs flaring outwardly from the said face and in an oblique direction thereto, and a friction-roller on the said pipe adjacent to the said body to be engaged by the forked guide of the other coupling member, substantially as described.

6. An automatic air-pipe coupling, having a member comprising a body with a longitudinally-extending coupling-face, a pipe leading from the said member for connection with the coupling-hose, a gasket set in the said face and projecting therefrom with the inner end of the gasket in communication with the pipe, a forked guide carried by the said body and extending with its prongs in front of the coupling-face, the outer ends of the prongs flaring outwardly from the said face and in an oblique direction thereto, and a bolt on the middle portion of the said guide for engagement with an ordinary coupling, the said bolt operating in conjunction with a slot in the edge of the said body to hold the ordinary coupling member in place, substantially as described.

7. An automatic air-pipe coupling, comprising a member having a longitudinally-extending coupling-face and provided with a slot in one edge and with a forked guide extending in front of the coupling-face, and having a bolt on its middle portion, substantially as and for the purpose set forth.

In testimony whereof I have signed my name to this specification in the presence of two subscribing witnesses.

JOHN W. SPURLOCK.

Witnesses:
C. L. KINARD,
T. A. SPURLIN.